United States Patent
Zhao et al.

(10) Patent No.: US 10,996,858 B2
(45) Date of Patent: May 4, 2021

(54) METHOD AND DEVICE FOR MIGRATING DATA

(71) Applicant: EMC IP Holding Company LLC, Hopkinton, MA (US)

(72) Inventors: Junping Zhao, Beijing (CN); Sen Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 28 days.

(21) Appl. No.: 15/709,770

(22) Filed: Sep. 20, 2017

(65) Prior Publication Data

US 2018/0088807 A1 Mar. 29, 2018

(30) Foreign Application Priority Data

Sep. 23, 2016 (CN) .......................... 201610847944.1

(51) Int. Cl.
*G06F 3/06* (2006.01)

(52) U.S. Cl.
CPC .............. *G06F 3/061* (2013.01); *G06F 3/065* (2013.01); *G06F 3/067* (2013.01); *G06F 3/0644* (2013.01); *G06F 3/0647* (2013.01)

(58) Field of Classification Search
CPC ...... G06F 3/061; G06F 3/0644; G06F 3/0647; G06F 3/065; G06F 3/067; G06F 3/0638
See application file for complete search history.

(56) References Cited

U.S. PATENT DOCUMENTS

| 5,649,151 | A | * | 7/1997 | Chu | ...................... G06F 3/0601 341/55 |
| 5,805,932 | A | * | 9/1998 | Kawashima | ............ H03M 7/48 360/48 |
| 9,116,858 | B1 | * | 8/2015 | Yokoi | ..................... H04L 67/06 |
| 9,311,002 | B1 | * | 4/2016 | Scott | ..................... G06F 3/0638 |

(Continued)

FOREIGN PATENT DOCUMENTS

| CN | 1127558 A | 7/1996 |
| CN | 101390063 A | 3/2009 |

(Continued)

OTHER PUBLICATIONS

First Chinese Office Action issued in related Chinese Application Serial No. 201610847944.1 dated May 11, 2020.

*Primary Examiner* — Yaima Rigol
(74) *Attorney, Agent, or Firm* — Brian J. Colandreo; Mark H. Whittenberger; Holland & Knight LLP

(57) ABSTRACT

Embodiments of the present disclosure relate to a method and device for migrating data. The method comprises identifying cold data in a primary storage system. The method further comprises, in response to determining that the cold data is in a non-compression state, obtaining the cold data from the primary storage system via a first interface, the first interface being configured for a user to access the primary storage system. The method further comprises obtaining, in response to determining the cold data is in a compression state, the cold data in the compression state from the primary storage system via a second interface that is different from the first interface. The method further comprises migrating the obtained cold data from the primary storage system to a secondary storage system.

17 Claims, 4 Drawing Sheets

(56) References Cited

U.S. PATENT DOCUMENTS

| | | | |
|---|---|---|---|
| 2005/0105124 A1* | 5/2005 | Ogasawara | H04N 1/333 |
| | | | 358/1.15 |
| 2007/0208893 A1* | 9/2007 | Azzarello | G06F 17/30153 |
| | | | 710/68 |
| 2009/0012982 A1* | 1/2009 | Merchia | H03M 7/30 |
| 2010/0332401 A1* | 12/2010 | Prahlad | H04L 67/1095 |
| | | | 705/80 |
| 2013/0151770 A1* | 6/2013 | Hara | G06F 3/0632 |
| | | | 711/114 |
| 2014/0281129 A1* | 9/2014 | Heller | G06F 3/0608 |
| | | | 711/103 |
| 2016/0077960 A1* | 3/2016 | Hung | G06F 12/0246 |
| | | | 711/103 |
| 2016/0313916 A1* | 10/2016 | Sivananainthaperumal | |
| | | | G06F 3/0685 |
| 2017/0255402 A1* | 9/2017 | Narasimha | G06F 12/1408 |
| 2017/0277435 A1* | 9/2017 | Wadhwa | G06F 3/0605 |

FOREIGN PATENT DOCUMENTS

| | | |
|---|---|---|
| CN | 103874979 A | 6/2014 |
| CN | 104813270 A | 7/2015 |

\* cited by examiner

METHOD AND DEVICE FOR MIGRATING DATA

RELATED APPLICATIONS

This application claim priority from Chinese Patent Application Number CN201610847944.1, filed on Sep. 23, 2016 at the State Intellectual Property Office, China, titled "METHOD AND DEVICE FOR MOVING DATA" the contents of which is herein incorporated by reference in its entirety.

FIELD

Embodiments of the present disclosure generally relate to the field of data storage, and more specifically, to a method and device for migrating data.

BACKGROUND

A tiering system typically includes a primary storage system and a secondary storage system. The primary storage system usually includes storage devices with higher access performance, higher prices and limited storage spaces while the secondary storage system includes storage devices with lower access performance, lower prices and larger storage spaces than the primary storage system.

Migrating data between the primary storage system and the secondary storage system is a common operation in the tiering system. Usually, data movement includes migration and recall. The migration generally includes migrating cold data from the primary storage system to the secondary storage system so as to increase the storage spaces of the primary storage system and to achieve cost effectiveness. The recall generally includes data transfer in an opposite direction to that of the migration, that is, in response to a request for data stored in the secondary storage system, transferring data from the secondary storage system to the primary storage system. Therefore, how to achieve much faster performance during data migration and recall becomes a hotspot for research.

SUMMARY

Embodiments of the present disclosure provide a method and device for migrating data.

In a first aspect, there is provided a method of migrating data. The method comprises identifying cold data in a primary storage system. The method further comprises in response to determining that the cold data is in a non-compression state, obtaining, via a first interface, the cold data from the primary storage system, the first interface being configured for a user to access the primary storage system. The method further comprises in response to determining that the cold data is in a compression state, obtaining, via a second interface, the cold data in the compression state from the primary storage system, the second interface being different from the first interface. The method further comprises migrating the obtained cold data from the primary storage system to a secondary storage system.

In some embodiments, the method further comprises adding a flag to metadata associated with the obtained cold data in the compression state, the flag indicating the compression state of the cold data.

In some embodiments, the method further comprises dividing uncompressed data corresponding to the cold data in the compression state into a plurality of logical segments; and creating a mapping between indexes of the plurality of logical segments and offsets of the plurality of logical segments in the cold data in the compression state.

In some embodiments, the method further comprises: in response to receiving a request for access to a part of the uncompressed data, determining a state of the uncompressed data; in response to determining that the uncompressed data is in a migrated state, determining, based on the request, at least one of the plurality of logical segments which corresponds to the part of the uncompressed data; and recalling, based on the mapping, compressed data associated with the determined at least one of the plurality of logical segments from the secondary storage system.

In some embodiments, the cold data is organized as a file, a data block or a data object.

In a second aspect, there is provided an electronic device. The electronic device comprises at least one processor and at least one memory. The at least one memory is coupled to the at least one processor and stores instructions to be executed by the at least one processor. The instructions, when executed by the at least one processor, cause the device to perform acts including: identifying cold data in a primary storage system; in response to determining that the cold data is in a non-compression state, obtaining, via a first interface, the cold data from the primary storage system, the first interface being configured for a user to access the primary storage system; in response to determining that the cold data is in a compression state, obtaining, via a second interface, the cold data in the compression state from the primary storage system, the second interface being different from the first interface; and migrating the obtained cold data from the primary storage system to a secondary storage system.

In a third aspect, there is provided a computer program product. The computer program product is tangibly stored on a non-transient computer readable medium and comprises machine executable instructions which, when executed, cause a machine to execute the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Example embodiments of the present disclosure will be described in more detail with reference to the accompanying drawings, in which the example embodiments of the present disclosure have been illustrated. However, it is to be understood the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As used herein, the term "includes" and its variants are to be read as open terms that mean "includes, but is not limited to." The term "based on" is to be read as "based at least in part on." The terms "one example embodiment" and "one embodiment" are to be read as "at least one example." The term "another embodiment" is to be read as "at least one other embodiment." The terms "first," "second," and the like may refer to different or same objects. Other definitions, explicit and implicit, may be included below.

Figure 1:
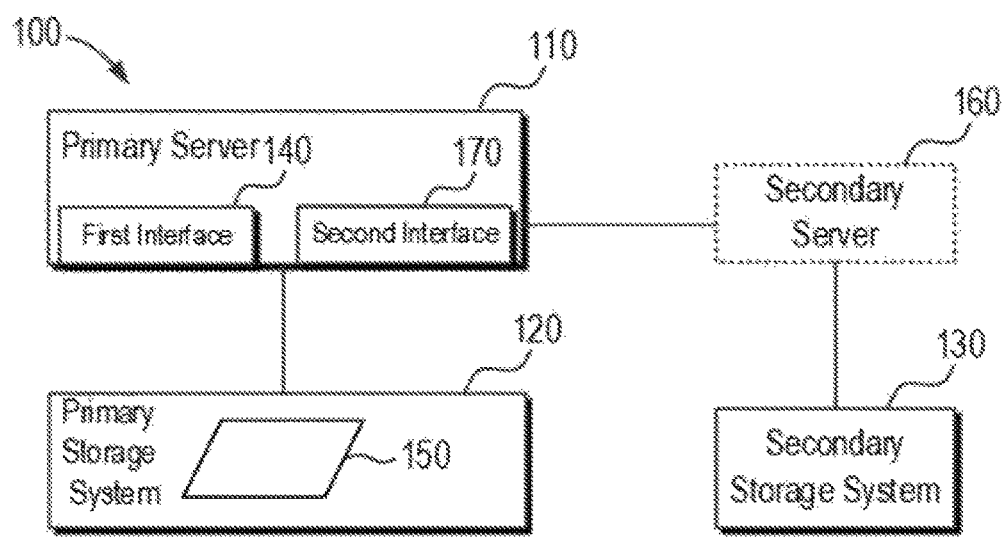
FIG. 1 shows a block diagram of an environment in which the embodiments of the present disclosure may be implemented.

FIG. 1 shows a block diagram of an environment 100 in which the embodiments of the present disclosure may be implemented. As shown in FIG. 1, the environment 100 comprises a primary server 110, a primary storage system 120 and a secondary storage system 130.

The primary server 110 is configured to manage or otherwise control operations of the primary storage system 120. The primary server 110 may communicate with the secondary storage system 130 via a computer network such as the Internet.

The primary server 110 may provide a first interface 140 for a user to access the primary storage system 120. As a non-limiting implementation, the first interface 140 may be an Application Programming Interface (API).

As one example, the primary server 110 may write data to the primary storage system 120 in response to receiving a request for writing the data to the primary storage system 120 from the user via the first interface 140. To improve the storage efficiency of the primary storage system 120, the primary server 110 may compress data before or after writing data to the primary storage system 120, and further store compressed data 150 in the primary storage system 120. As another example, the primary server 110 may read data from the primary storage system 120 in response to receiving a request for reading data from the primary storage system 120 from the user via the first interface 140. Where the read data is compressed data, the primary server 110 decompresses the compressed data 150 and then provides the decompressed data to the user via the first interface 140.

The primary storage system 120 usually comprises storage devices with higher access performance, higher prices and limited storage spaces. Examples of the primary storage system 120 may include but not limited to an enterprise-level storage system. The secondary storage system 130 usually comprises storage devices with lower access performance, lower price and larger storage spaces than the primary storage system 120. Examples of the secondary storage system 130 may include but not limited to a cloud storage system.

To save the storage space of the primary storage system 120 for achieving cost effectiveness, the primary server 110 usually migrates cold data from the primary storage system 120 to the secondary storage system via a network, keeps metadata associated with the cold data, and reclaims storage spaces in the primary storage system 120 which are used to store the cold data.

At present, when cold data is migrated from the primary storage system 120 to the secondary storage system 130, the first interface 140 as described above is leveraged to obtain the cold data from the primary storage system 120. Similar to a response to user access to the primary storage system 120, in the case where cold data read from the primary storage system 120 is compressed data, the cold data obtained via the first interface 140 is decompressed cold data. Thus, the decompressed cold data is migrated to the secondary storage system 130.

It may be understood what data migration focuses on is to recall storage spaces in the primary storage system 120 which are used to store cold data, rather than content of the cold data. In this regard, it is inessential to decompress compressed cold data read from the primary storage system 120.

In some embodiments, the environment 100 may optionally comprise a secondary server 160 for preprocessing data before storing data to the secondary storage system 130. The preprocessing performed by the secondary server 160 may include but not limited to caching data, deleting duplicated data, compressing data, and encrypting data. For example, where it is determined that data received from the primary server 110 is uncompressed data, the secondary server 160 may compress the received data and further store compressed data to the secondary storage system 130, so as to save the storage space of the secondary storage system 130. Thus, it can be seen if the primary server 110 decompresses compressed cold data read from the primary storage system 120, the secondary server 160 might re-compress the decompressed data received from the primary server 110, which increases the processing of the secondary server 160.

In addition, the decompression operation requires computing resources (e.g., a central processing unit (CPU)) of the primary server 110. Furthermore, transferring decompressed data to the secondary storage system 130 needs more network resources than transferring compressed data.

Figure 2:
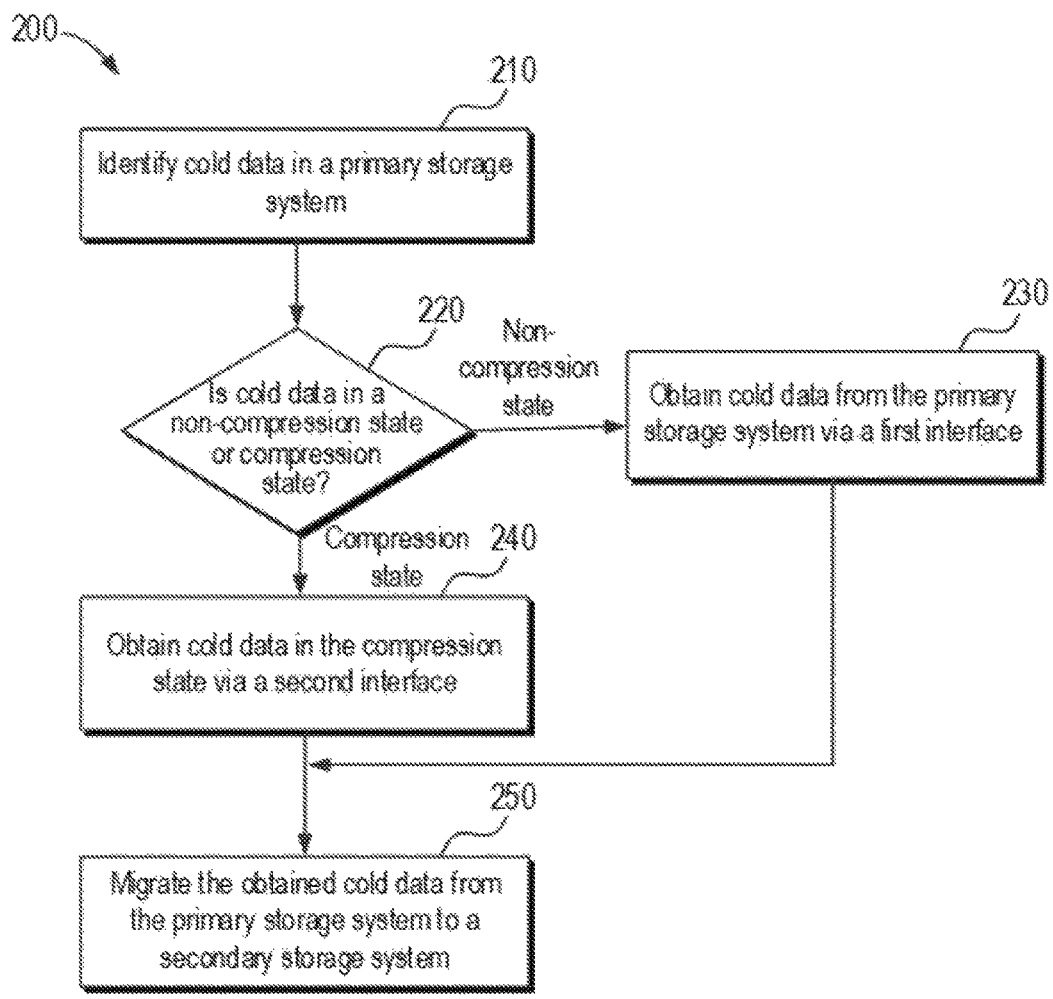
FIG. 2 shows a flowchart of a method of migrating data according to an embodiment of the present disclosure.

To at least partially solve the above and other potential drawbacks and problems of existing schemes, the embodiments of the present disclosure provide a second interface 170 that is different from the existing first interface 140. The second interface 170 is used for migrating compressed cold data, which avoids migration after decompressing compressed cold data and thus realizes much faster data migration. With reference to FIG. 2, detailed description is presented below to the embodiments of the present disclosure.

FIG. 2 shows a flowchart of a method 200 of migrating data according to an embodiment of the present disclosure. For example, the method 200 may be performed by the primary server 110 as shown in FIG. 1. It should be understood that the method 200 may further comprise additional steps that are not shown and/or may omit one or more steps that are shown, and the scope of the present disclosure is not limited in this regard.

According to the method 200, at 210, the primary server 110 identifies cold data in the primary storage system 120. In some embodiments, cold data is organized as a file, a data block or a data object in the primary storage system 120.

In some embodiments, the primary server 120 may identify cold data in the primary storage system 120 based on a predefined policy. The predefined policy may indicate an identification mode (i.e., which data can be identified as cold data) and an identification time (i.e., when to identify cold data) of cold data. Table 1 shows an example of the predefined policy below. It should be understood that the policy shown in Table 1 is merely exemplary. Depending on concrete needs and environment, any other appropriate policy is also possible.

TABLE 1

| Identification Mode | Identification Time |
| --- | --- |
| Last Accessed Time | Now |
| Last Modified Time | Every day at specific time |
| Last Attribute Changed | On a specific day/time of the week |
| File Size | On a specific day/time of the month |
| File Name/File Extension (with Regular Expressions) | Once on a specific day/time in the future |
| Directory Name (Include/Exclude) | When a specified capacity threshold is met |

At 220, the primary server 110 determines whether the cold data is in a non-compression state or a compression state. If it is determined that the cold data is in a non-compression state, the method 200 proceeds to 230 at which the cold data is obtained from the primary storage system 120 via the first interface 140. The first interface 140 is configured for a user to access the primary storage system 120.

On the other hand, if it is determined at 220 that the cold data is in a compression state, the method 200 proceeds to 240 at which the cold data in the compression state (hereinafter referred to as "compressed cold data") is obtained from the primary storage system 120 via the second interface 170 that is different from the first interface 140. As a non-limiting implementation, the second interface 170 may be an API.

At 250, the primary server 110 migrates the obtained cold data from the primary storage system 120 to the secondary storage system 130.

According to the embodiments of the present disclosure, where it is determined that the cold data is in a compression state, the primary server 110 obtains the compressed cold data from the primary storage system 120 via the second interface 170 that is different from the first interface 140 for the user to access the primary storage system 120. Without decompressing the cold data, the primary server 110 migrates the compressed cold data to the secondary storage system 130. Thereby, unnecessary processing (i.e., decompression) is eliminated for the primary server 110, computing resources needed for performing the unnecessary processing are saved, and the data transfer amount is decreased, and thus much faster data migration is achieved. In addition, the compressed cold data may be directly stored to the secondary storage system 130, and thus the storage space of the secondary storage system 130 is saved.

Moreover, in embodiments where the secondary server 160 is deployed between the primary server 110 and the secondary storage system 130, a flag may be added to metadata associated with the obtained cold data so as to indicate to the secondary server 160 that the cold data has been compressed. Thus, the processing of the secondary server 160 is reduced.

After cold data is migrated to the secondary storage system 130, the primary server 110 deletes the cold data from the primary storage system 120 so as to reclaim storage spaces which are used to store the cold data. In addition, the primary server 110 updates content of the metadata associated with the cold data that is stored in the primary storage system 120. For example, where the metadata contains a state indication about uncompressed data corresponding to the compressed cold data, the primary server 110 may update the state indication as "migrated". In addition, the primary server 110 stores information (e.g., a Uniform Resource Locator (URL) with a universally unique identifier (UUID)) concerning a storage position of the cold data in the secondary storage system 130 in the metadata associated with the cold data.

In addition, in traditional solutions, when receiving a request for access to a part of uncompressed data corresponding to compressed cold data, if the uncompressed data is stored to the secondary storage system 130 without being compressed, the primary server 110 will fully recall the uncompressed data from the secondary storage system 130. Meanwhile, if the uncompressed data is stored to the secondary storage system 130 after being compressed, the primary server 110 will fully recall from the secondary storage system 130 compressed data corresponding to the uncompressed data. It can be seen that the existing solutions adopt a full recall approach even if the user only wants to access a part of uncompressed data. Such a full recall approach not only occupies excessive network resources but also extends wait time of the user, leading to a poor user experience.

Unlike the traditional solutions, in the embodiments of the present disclosure, since compressed cold data is migrated to the secondary storage system 130, when the user wants to access uncompressed data corresponding to the cold data, the compressed data may directly be recalled from the secondary storage system 130. Thereby, much faster data recall is realized and the wait time of the user is shortened.

Further, the embodiments of the present disclosure further support partial recall of compressed data, in place of full recall in existing solutions. To implement partial recall of compressed data, in some embodiments, the primary server 110 divides uncompressed data corresponding to compressed cold data into a plurality of logical segments, and creates a mapping between indexes of the plurality of logical segments and offsets of the plurality of logical segments in the compressed cold data. In some embodiments, the plurality of logical segments may have a fixed length. In other embodiments, the plurality of logical segments may have a variable length.

In some embodiments, the mapping may be implemented as a mapping relation table, as shown in Table 2 below. Note the example given in Table 2 is only for causing those skilled in the art to have a more intuitive understanding of the present disclosure and not intended to limit the scope of the present disclosure.

TABLE 2

| | Index | | | | | |
| --- | --- | --- | --- | --- | --- | --- |
| | 0 | 1 | 2 | 3 | 4 | 5 |
| Offset | Offset1 | Offset2 | Offset3 | Offset4 | Offset4 | Offset5 |

In the example as shown in Table 2 above, uncompressed data corresponding to compressed cold data is divided into 5 logical segments. For example, it is assumed that the size of the uncompressed data is 100M bytes (B). If each resultant logical segment has a fixed length, the size of each logical segment is 20M. For another example, it is assumed that a logical segment with an index of 0 (abbreviated as logical segment 0) has a size of 10M after being compressed, a logical segment with an index of 1 (abbreviated as logical segment 1) has a size of 5M after being compressed, and a logical segment with an index of 2 (abbreviated as logical segment 2) has a size of 8M after being compressed. Then, offset 1 for logical segment 0 is 0, offset 2 for logical segment 1 is 10, offset 3 for logical segment 2 is 15, and offset 4 for logical segment 3 is 23.

Alternatively or additionally, in other embodiments, the foregoing mapping may further be implemented by using the form of a matrix or vector. The scope of the present disclosure is not limited in this regard.

It should be understood that dividing uncompressed data into logical segments and creating a mapping may be implemented at any time after the identifying cold data (210) and before deleting the cold data from the primary storage system 120, and the scope of the present disclosure is not limited in this regard.

According to the embodiments of the present disclosure, when receiving from the user a request for access to a part of uncompressed data corresponding to compressed cold data, the primary server 110 determines a state of the uncompressed data. As described above, metadata associated with the compressed cold data may contain a state indication about uncompressed data corresponding to the cold data. After the compressed cold data is migrated to the secondary storage system 130, the primary server 110 may update the state indication as "migrated". Therefore, in some embodiments, the primary server 110 may check the state indication in the metadata so as to determine the state of the uncompressed data.

The access request received from the user may indicate a start position of a part of uncompressed data to be accessed in the uncompressed data and a size of the part. Therefore, in response to determining the uncompressed data is in a migrated state, the primary server 110 may determine at least one of the plurality of logical segments which corresponds to the part of the uncompressed data based on the access request.

Still refer to the example as shown in Table 2 above. In this example, it is assumed that the size of the uncompressed data is 100 MB and each resultant logical segment has a fixed length and a size of 20M. The access request received from the user indicates the start position of the part of uncompressed data to be accessed in the uncompressed data is 42 MB and the size of the part is 15M. Therefore, it may be determined based on the access request that a logical segment in the plurality of logical segments which corresponds to the part is the logical segment 2.

Subsequently, the primary server 110 may recall compressed data associated with the determined logical segment from the secondary storage system 130 based on the created mapping. For instance, in the example shown in Table 2 above, the primary server 110 may determine based on Table 2 that the offset of logical segment 2 is 15, and further may recall from the secondary storage system 130 compressed data with offsets ranging between 15 and 23 in the compressed cold data.

In the embodiments of the present disclosure, when the user wants to access a part of uncompressed data corresponding to compressed cold data, only compressed data corresponding to the part is recalled, thereby shortening a wait time for the user to access the primary storage system and improving the user experience.

Figure 3:
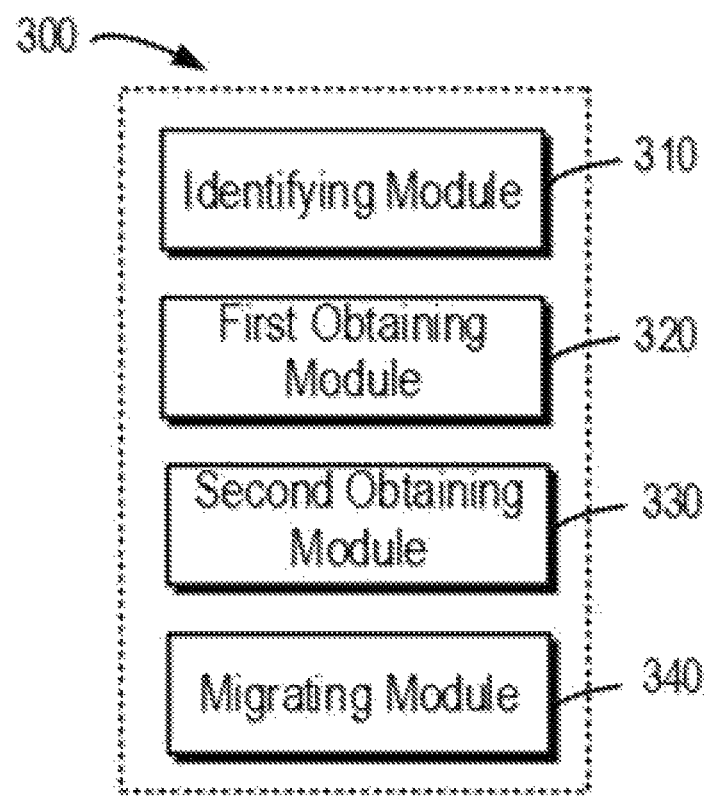
FIG. 3 shows a block diagram of an apparatus for migrating data according to an embodiment of the present disclosure.

The embodiments of the present disclosure further provide an apparatus for migrating data. FIG. 3 shows a block diagram of an apparatus 300 for migrating data according to one embodiment of the present disclosure. For example, the apparatus 300 may be implemented as the primary server 110 as shown in FIG. 1.

As shown in FIG. 3, the apparatus 300 may comprise an identifying module 310 configured to identify cold data in a primary storage system. The apparatus 300 may further comprise a first obtaining module 320 configured to obtain, in response to determining the cold data is in a non-compression state, the cold data from the primary storage system via a first interface. The first interface is configured for a user to access the primary storage system. The apparatus 300 may further comprise a second obtaining module 330 configured to obtain, in response to determining the cold data is in a compression state, the cold data in the compression state from the primary storage system via a second interface different from the first interface. The apparatus 300 may further comprise a migrating module 340 configured to migrate the obtained cold data from the primary storage system to a secondary storage system.

In some embodiments, the apparatus 300 may further comprise an adding module configured to add a flag to metadata associated with the cold data in the compression state. The flag indicates the compression state of the cold data.

In some embodiments, the apparatus 300 may further comprise a dividing module and a creating module. The dividing module is configured to divide uncompressed data corresponding to the cold data in the compression state into a plurality of logical segments. The creating module is configured to create a mapping between indexes of the plurality of logical segments and offsets of the plurality of logical segments in the cold data in the compression state.

In some embodiments, the apparatus 300 may further comprise a state determining module, a logical segment determining module and a recalling module. The state determining module is configured to determine, in response to receiving a request for access to a part of the uncompressed data, a state of the uncompressed data. The logical segment determining module is configured to determine, in response to determining the uncompressed data is a migrated state, at least one of the plurality of logical segment which corresponds to the part of the uncompressed data based on the access request. The recalling module is configured to recall compressed data associated with the determined at least one logical segment from the secondary storage system based on the mapping.

In some embodiments, the cold data is organized as a file, a data block or a data object.

For the clarity purpose, some optional modules of the apparatus 300 are not shown in FIG. 3. However, it should be understood that various features described with reference to FIGS. 1 and 2 are also applicable to the apparatus 300. Moreover, various modules of the apparatus 300 may be hardware modules or software modules. For example, in some embodiments, the apparatus 300 may be implemented partially or completely with software and/or firmware, for example, implemented as a computer program product embodied on a computer readable medium. Alternatively or additionally, the apparatus 300 may be implemented partially or completely with hardware, for example, implemented as an integrated circuit (IC) chip, application-specific integrated circuit (ASIC), system on chip (SOC), field programmable gate array (FPGA) etc. The scope of the present invention is not limited in this regard.

Figure 4:
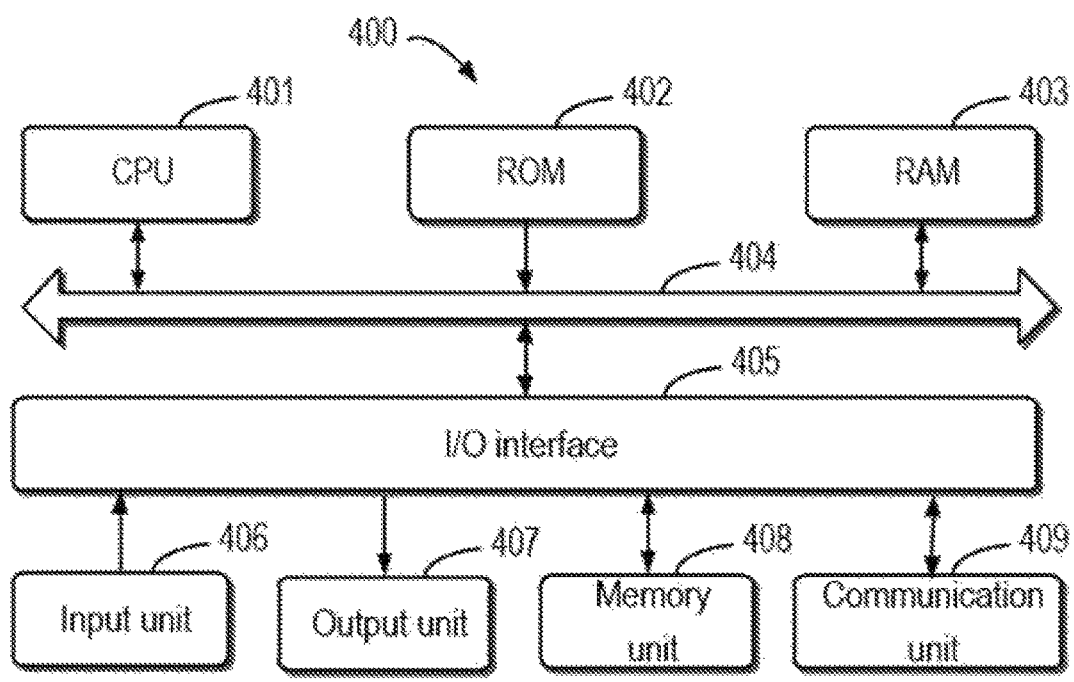
FIG. 4 shows a schematic block diagram of an exemplary device which is applicable to implement the embodiments of the present invention.

FIG. 4 illustrates a schematic block diagram of an exemplary device 400 which is applicable to implement the embodiments of the present disclosure. As illustrated in FIG. 6, the device 400 includes: Central Process Unit (CPU) 401, which may execute various appropriate actions and treatment according to computer program instructions stored in Read Only Memory (ROM) 402 or computer program instructions loaded from a memory unit 408 to Random Access Memory (RAM) 403. In the RAM 403, there may be stored various programs and data needed by operations of the device 400. The CPU 401, ROM 402 and RAM 403 are coupled to one another via a bus 404. An input/output (I/O) interface 405 is also coupled to the bus 404.

Multiple components in the device 400 are coupled to the I/O interface 405, including: an input unit 406, such as a keyboard, a mouse, etc.; an output unit 407, such as various types of displays and loudspeakers, etc.; a memory unit 408, such as a magnetic disk, an optical disk, etc.; and a communication unit 409, such as an Internet card, a modem, a wireless communication transceiver, etc. The communication unit 409 allows the device 400 to exchange information/data with other device by means of a computer network such as the Internet and/or various telecommunication networks.

Various processes and treatment described above, for example, the method 200 and/or 300, may be executed by a processing unit 401. For example, in some embodiment, the method 200 and/or 300 may be implemented as a computer software program, which is tangibly embodied on a machine readable medium such as the memory unit 408. In some embodiments, part or all of the computer program may be loaded and/or installed to the device 400 via the ROM 402 and/or the communication unit 409. The computer program, when loaded to the RAM 403 and executed by the CPU 401, may perform one or more steps of the method 200 and/or 300 described above. Alternatively, in other embodiments, the CPU 401 may also be configured in any other appropriate manner so as to implement the method 200.

The present disclosure may be a method, apparatus, system and/or computer program product. The computer program product may include a computer readable storage medium having computer readable program instructions for executing various aspects of the present disclosure carried thereon.

The computer readable storage medium may be a tangible device that may hold and store instructions used by an instruction execution device. The computer readable storage medium may be, for example, but not limited to, an electronic, magnetic, optical, electromagnetic, or semiconductor storage device or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanical coding device such as a punch card having instructions stored thereon, or any suitable combination of the foregoing. The computer readable storage medium used here is not interpreted as an instantaneous signal itself, such as a radio wave or other freely propagated electromagnetic wave, electromagnetic wave propagated through a waveguide or other transmission medium (such as an optical pulse through an optical fiber cable), or an electric signal transmitted through an electric wire).

The computer readable program instructions described here may be loaded from the computer readable storage medium to various computing/processing devices, or loaded to an external computer or external storage device via a network such as the Internet, a local area network, a wide area network and/or a wireless network. The network may comprise a copper transmission cable, optical transmission, wireless transmission, router, firewall, switch, gateway computer and/or edge server. The network adapter card or network interface in each computing/processing device receives computer readable program instructions from the network and forwards the computer readable program instructions so as to be stored in computer readable storage media in various computing/processing devices.

The computer program instructions used for executing operations of the present disclosure may be assembly instructions, instruction set architecture (ISA) instructions, machine instructions, machine-related instructions, micro code, firmware instructions, status setting data, or source code or target code written in one or more programming languages, including an object oriented programming language such as Smalltalk, C++ or the like and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry may be customized using status information of the computer readable program instructions, such as programmable logic circuit, field programmable gate array (FPGA) or programmable logic array (PLA), which electronic circuitry may execute the computer readable program instructions and thereby implement various aspects of the present disclosure.

Aspects of the present disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of migrating data, comprising:
   identifying, via a primary server, cold data in a primary storage system;
   in response to determining that the cold data is in a non-compressed state, obtaining, via a first interface, the cold data from a primary storage system, the first interface being configured for a user to access the primary storage system;
   in response to determining that the cold data is in a compressed state, obtaining, via a second interface, the cold data in the compressed state from the primary storage system, the second interface being different from the first interface;
   preprocessing, via a secondary server, uncompressed data from the primary storage system prior to migrating the uncompressed data to a secondary storage system, wherein preprocessing the uncompressed data includes, at least in part, caching the uncompressed data, deleting duplicated uncompressed data, compressing the uncompressed data, and encrypting the uncompressed data;
   adding a flag to metadata associated with the obtained cold data in the compressed state;
   processing, via the secondary server, the obtained cold data in the compressed state without decompressing the obtained cold data in the compressed state;
   migrating the obtained cold data in the non-compressed state and the obtained cold data in the compressed state from the primary storage system to a secondary storage system;
   dividing uncompressed data corresponding to the cold data in the compressed state into a plurality of logical segments and creating a mapping between indexes of the plurality of logical segments and one or more offsets of the plurality of logical segments in the cold data in the compressed state, wherein dividing uncompressed data corresponding to the cold data in the compressed state into a plurality of logical segments and creating a mapping between indexes of the plurality of logical segments and one or more offsets of the plurality of logical segments in the cold data in the compressed state occurs after the cold data in the primary storage system is identified and before deleting cold data from the primary storage system; and
   recalling, in response to receiving a request from a user for access to a part of uncompressed data corresponding to compressed cold data, only a portion of the compressed data that corresponds to the part of uncompressed data requested, wherein the portion of the compressed data is associated with at least one of the plurality of logical segments from the secondary storage system.

2. The method according to claim 1, further comprising:
   in response to receiving a request for access to a part of the uncompressed data, determining a state of the uncompressed data; and
   in response to determining that the uncompressed data is in a migrated state, determining, based on the request, at least one of the plurality of logical segments that corresponds to the part of the uncompressed data.

3. The method according to claim 1, wherein the cold data is organized as a file, a data block, or a data object.

4. The method according to claim 1, wherein identifying, via a primary server, cold data in a primary storage system is based upon, at least in part, a predefined policy.

5. The method according to claim 4, wherein the predefined policy includes an identification mode.

6. The method according to claim 1, further comprising:
   updating, via the primary server, contents of metadata associated with the cold data in the primary storage system after migrating the obtained cold data in the non-compressed state and the obtained cold data in the compressed state from the primary storage system to a secondary storage system.

7. The method according to claim 1, further comprising:
   storing information in the primary server regarding a position of the migrated obtained cold data in the non-compressed state and the obtained cold data in the compressed state in the secondary storage system, wherein the information comprises at least a Uniform Resource Locator (URL) with a universally unique identifier (UUID).

8. The method according to claim 1, wherein the mapping between indexes of a plurality of logical segments and one or more offsets of the plurality of logical segments in the cold data in the compressed state is implemented in the form of a mapping relation table and one or more of a matrix and a vector.

9. The method according to claim 1, wherein the secondary storage system comprises a lower access performance in comparison to the primary storage system.

10. The method according to claim 1, wherein the secondary storage system further comprises a larger storage space in comparison to the primary storage system.

11. The method according to claim 1, wherein the primary storage system is an enterprise-level storage system and the secondary storage system is a cloud storage system.

12. An electronic device, comprising:
    at least one processor; and
    at least one memory coupled to the at least one processor and storing instructions to be executed by the at least one processor, the instructions, when executed by the at least one processor, causing the device to perform acts including:
- identifying, via a primary server, cold data in a primary storage system;
- in response to determining that the cold data is in a non-compressed state, obtaining, via a first interface, the cold data from a primary storage system, the first interface being configured for a user to access the primary storage system;
- in response to determining that the cold data is in a compressed state, obtaining, via a second interface, the cold data in the compressed state from the primary storage system, the second interface being different from the first interface;
- preprocessing, via a secondary server, uncompressed data from the primary storage system prior to migrating the uncompressed data to a secondary storage system, wherein preprocessing the uncompressed data includes, at least in part, caching the uncompressed data, deleting duplicated uncompressed data, compressing the uncompressed data, and encrypting the uncompressed data;
- adding a flag to metadata associated with the obtained cold data in the compressed state;
- processing, via the secondary server, the obtained cold data in the compressed state without decompressing the obtained cold data in the compressed state;
- migrating the obtained cold data in the non-compressed state and the obtained cold data in the compressed state from the primary storage system to a secondary storage system;
- dividing uncompressed data corresponding to the cold data in the compressed state into a plurality of logical segments and creating a mapping between indexes of the plurality of logical segments and one or more offsets of the plurality of logical segments in the cold data in the compressed state, wherein dividing uncompressed data corresponding to the cold data in the compressed state into a plurality of logical segments and creating a mapping between indexes of the plurality of logical segments and one or more offsets of the plurality of logical segments in the cold data in the compressed state occurs after the cold data in the primary storage system is identified and before deleting cold data from the primary storage system; and
- recalling, in response to receiving a request from a user for access to a part of uncompressed data corresponding to compressed cold data, only a portion of the compressed data that corresponds to the part of uncompressed data requested, wherein the portion of the compressed data is associated with at least one of the plurality of logical segments from the secondary storage system.

13. The device according to claim 12, wherein the acts further include:
- in response to receiving a request for access to a part of the uncompressed data, determining a state of the uncompressed data; and
- in response to determining that the uncompressed data is in a migrated state, determining, based on the request, at least one of the plurality of logical segments that corresponds to the part of the uncompressed data.

14. The device according to claim 12, wherein the cold data is organized as a file, a data block, or a data object.

15. A computer program product for migrating data, the computer program product comprising:
a non-transitory computer readable medium encoded with computer-executable program code for migrating data, the code configured to enable the execution of:
- identifying, via a primary server, cold data in a primary storage system;
- in response to determining that the cold data is in a non-compressed state, obtaining, via a first interface, the cold data from a primary storage system, the first interface being configured for a user to access the primary storage system;
- in response to determining that the cold data is in a compressed state, obtaining, via a second interface, the cold data in the compressed state from the primary storage system, the second interface being different from the first interface;
- preprocessing, via a secondary server, uncompressed data from the primary storage system prior to migrating the uncompressed data to a secondary storage system, wherein preprocessing the uncompressed data includes, at least in part, caching the uncompressed data, deleting duplicated uncompressed data, compressing the uncompressed data, and encrypting the uncompressed data;
- adding a flag to metadata associated with the obtained cold data in the compressed state;
- processing, via the secondary server, the obtained cold data in the compressed state without decompressing the obtained cold data in the compressed state;
- migrating the obtained cold data in the non-compressed state and the obtained cold data in the compressed state from the primary storage system to a secondary storage system;
- dividing uncompressed data corresponding to the cold data in the compressed state into a plurality of logical segments and creating a mapping between indexes of the plurality of logical segments and one or more offsets of the plurality of logical segments in the cold data in the compressed state, wherein dividing uncompressed data corresponding to the cold data in the compressed state into a plurality of logical segments and creating a mapping between indexes of the plurality of logical segments and one or more offsets of the plurality of logical segments in the cold data in the compressed state occurs after the cold data in the primary storage system is identified and before deleting cold data from the primary storage system; and
- recalling, in response to receiving a request from a user for access to a part of uncompressed data corresponding to compressed cold data, only a portion of the compressed data that corresponds to the part of uncompressed data requested, wherein the portion of the compressed data is associated with at least one of the plurality of logical segments from the secondary storage system.

16. The computer program product according to claim 15, wherein the code is further configured to enable the execution of:
- in response to receiving a request for access to a part of the uncompressed data, determining a state of the uncompressed data; and
- in response to determining that the uncompressed data is in a migrated state, determining, based on the request, at least one of the plurality of logical segments that corresponds to the part of the uncompressed data.

17. The computer program product according to claim 15, wherein the cold data is organized as a file, a data block, or a data object.

\* \* \* \* \*